(12) United States Patent
Yoshiwara

(10) Patent No.: US 8,759,463 B2
(45) Date of Patent: Jun. 24, 2014

(54) CROSS-LINKABLE RESIN SHAPED ARTICLE, CROSS-LINKED RESIN SHAPED ARTICLE AND LAMINATE

(75) Inventor: Akihiko Yoshiwara, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 13/995,074

(22) PCT Filed: Dec. 16, 2011

(86) PCT No.: PCT/JP2011/079148
§ 371 (c)(1),
(2), (4) Date: Jun. 17, 2013

(87) PCT Pub. No.: WO2012/081691
PCT Pub. Date: Jun. 21, 2012

(65) Prior Publication Data
US 2013/0267672 A1 Oct. 10, 2013

(30) Foreign Application Priority Data
Dec. 17, 2010 (JP) .................................. 2010-281422

(51) Int. Cl.
*C08F 232/08* (2006.01)
*C08G 61/08* (2006.01)
*B32B 27/32* (2006.01)
*C08F 2/02* (2006.01)

(52) U.S. Cl.
USPC ........... 526/284; 526/283; 526/326; 526/902; 428/411.1; 428/521

(58) Field of Classification Search
USPC .................. 526/283, 284, 326, 902; 525/289; 428/411.1, 521
See application file for complete search history.

(56) References Cited

U.S. PATENT DOCUMENTS

| 2006/0258828 A1 | 11/2006 | Sugawara et al. |
| 2007/0191563 A1* | 8/2007 | Sugawara .................... 526/283 |
| 2008/0125531 A1 | 5/2008 | Sugawara |
| 2009/0305018 A1 | 12/2009 | Ohtaki et al. |
| 2010/0090163 A1* | 4/2010 | Irisawa et al. ............ 252/299.62 |
| 2010/0124615 A1 | 5/2010 | Ohtaki et al. |
| 2010/0324247 A1 | 12/2010 | Kojima et al. |
| 2011/0144292 A1 | 6/2011 | Kojima et al. |

FOREIGN PATENT DOCUMENTS

| JP | 2009-242568 A | 10/2009 |
| JP | 2010-59363 A | 3/2010 |
| WO | WO 2004/067601 A1 | 8/2004 |
| WO | WO 2005/016991 A1 | 2/2005 |
| WO | WO 2008/047895 A1 | 4/2008 |
| WO | WO 2010/047349 A1 | 4/2010 |

OTHER PUBLICATIONS

International Search Report for PCT/JP2011/079148 dated Mar. 13, 2012.

* cited by examiner

*Primary Examiner* — Fred M Teskin
(74) *Attorney, Agent, or Firm* — Birch, Stewart, Kolasch & Birch, LLP

(57) ABSTRACT

A cross-linkable resin shaped article which contains a heat curable resin, cross-linking agent, and condensed aromatic polycyclic compound which has a (meth)acryloyloxy group, a cross-linked resin shaped article which is comprised of that cross-linkable resin shaped article which is cross-linked, and a laminate which is obtained by using these are provided. The cross-linkable resin shaped article and cross-linked resin shaped article of the present invention are excellent in heat resistance and further are useful in production of a low linear expansion laminate.

9 Claims, No Drawings

CROSS-LINKABLE RESIN SHAPED ARTICLE, CROSS-LINKED RESIN SHAPED ARTICLE AND LAMINATE

TECHNICAL FIELD

The present invention relates to a cross-linkable resin shaped article, a cross-linked resin shaped article, and a laminate. More particularly, it relates to a cross-linkable resin shaped article and a cross-linked resin shaped article which are useful for production of a laminate which is excellent in heat resistance and low in linear expansion and to a laminate which is obtained by using these.

BACKGROUND ART

In the electronic devices which have been used in the field of information communications in recent years, signals are becoming larger in capacity and faster in speed. For this reason, printed circuit boards which are excellent in high frequency characteristics and which can handle the greater number of layers used for increasing the number of interconnects are being demanded.

In the printed circuit boards which are used for such electronic devices, to maintain reliability in the high frequency region, a low dielectric constant and low dielectric tangent plus a superior heat resistance are demanded.

As opposed to this, for example, Patent Document 1 discloses a laminate which is produced by using a prepreg obtained by impregnating reinforcing fiber with a polymerizable composition which contains a cycloolefin monomer, metathesis polymerization catalyst, cross-linking agent, chain transfer agent, and dimethacrylate compound and polymerizing this and which can be suitably used for a high frequency circuit board.

Further, Patent Document 2 discloses a printed circuit board which is produced by using a prepreg obtained by impregnating a fibrous base material with a polyphenylene ether resin composition which contains a number average molecular weight 1000 to 5000 polyphenylene ether, an epoxy compound which has a naphthalene ring in the molecular structure, a cyanate ester compound, a phosphorus-based flame retardant, and a curing catalyst and drying this.

PRIOR ART DOCUMENTS

Patent Documents

Patent Document 1: Japanese Patent Publication No. 2009-242568A
Patent Document 2: Japanese Patent Publication No. 2010-59363A

DISCLOSURE OF THE INVENTION

Problem to be Solved by the Invention

However, the laminate and printed circuit board which are obtained in the above Patent Document 1 and Patent Document 2 are excellent in heat resistance, but are not sufficiently low in linear expansion coefficient, so sometimes are inferior in reliability.

The object of the present invention is to provide a cross-linkable resin shaped article and cross-linked resin shaped article which are useful for production of a laminate which is excellent in heat resistance and low in linear expansion and a laminate which is obtained using the same.

Means for Solving the Problems

The inventor engaged in in-depth studies in consideration of the above problems and as a result discovered that a cross-linkable resin shaped article which contains a heat curable resin, cross-linking agent, and condensed aromatic polycyclic compound which has a (meth)acryloyloxy group and a cross-linked resin shaped article which is obtained by using such a cross-linkable resin shaped article are useful for production of a laminate which is excellent in heat resistance and low in linear expansion. The inventor completed the present invention based on this discovery.

That is, according to the present invention, there are provided:

[1] A cross-linkable resin shaped article which contains a heat curable resin, cross-linking agent, and condensed aromatic polycyclic compound which has a (meth)acryloyloxy group,

[2] the cross-linkable resin shaped article described in the above [1] wherein the condensed aromatic polycyclic compound which has a (meth)acryloyloxy group is a compound which is shown in the following general formula (1)

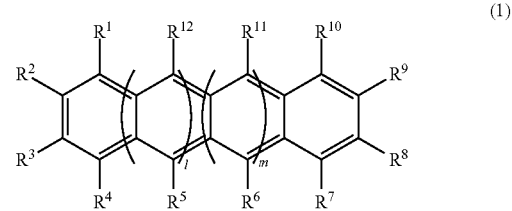

[where, in formula (1), "l" and "m" are respectively integers of 0 to 10, at least one of $R^1$ to $R^{12}$ is a substituent which is shown by the formula (2): $-L_p(-M)_n$ (where, in formula (2), L is a divalent to tetravalent $C_1$ to $C_{20}$ organic group which may contain a hetero atom, M is a (meth)acryloyloxy group, and "n" is an integer of 1 to 3. "p" is 0 or 1)

a substituent other than the substituent expressed by said formula (2) is at least one selected from the group which is consisted of a hydrogen atom, halogen atom, $C_1$ to $C_{20}$ linear or branched alkyl group, $C_1$ to $C_{20}$ linear or branched alkenyl group, aryl group, and hetero atom-containing group].

[3] the cross-linkable resin shaped article described in the above [2] wherein the condensed aromatic polycyclic compound which has a (meth)acryloyloxy group is one which has two substituents which are expressed by the formula (2),

[4] the cross-linkable resin shaped article described in the above [3] wherein the condensed aromatic polycyclic compound which has a (meth)acryloyloxy group is 1,4-dimethacryloyloxynaphthalene,

[5] the cross-linkable resin shaped article described in any one of the above [1] to [4] wherein the amount of the condensed aromatic polycyclic compound which has a (meth)acryloyloxy group is 0.1 to 100 parts by weight with respect to 100 parts by weight of the heat curable resin,

[6] the cross-linkable resin shaped article described in any one of the above [1] to [5] wherein the heat curable resin is a cycloolefin polymer,

[7] the cross-linkable resin shaped article described in the above [6] which is obtained by bulk polymerizing a polymerizable composition containing a cycloolefin monomer, metathesis polymerization catalyst, said cross-linking agent, and said condensed aromatic polycyclic compound which has a (meth)acryloyloxy group,

[8] a cross-linked resin shaped article which is obtained by cross-linking a cross-linkable resin shaped article described in any of the above [1] to [7], and

[9] a laminate which has at least a layer which is comprised of a cross-linkable resin shaped article described in any of the above [1] to [7] or a cross-linked resin shaped article described in the above [8].

Effects of the Invention

According to the present invention, a cross-linkable resin shaped article and cross-linked resin shaped article which are useful for production of a laminate which is excellent in heat resistance and low in linear expansion and a laminate which is obtained by using the same are provided. The laminate of the present invention is excellent in heat resistance and further is low in linear expansion, so can be suitably used for a board of various electronic devices.

DESCRIPTION OF EMBODIMENTS

The cross-linkable resin shaped article of the present invention includes a heat curable resin, cross-linking agent, and condensed aromatic polycyclic compound which has a (meth)acryloyloxy group.

(Heat Curable Resin)

The heat curable resin which is used in the present invention is a resin which has a cross-linkable functional group or cross-linkable carbon-carbon unsaturated bond and can become a cross-linked resin by heating in the presence of a cross-linking agent. It is not particularly limited, but, for example, a cycloolefin polymer, conjugated diene-type polymer, epoxy resin, phenol resin, polyamide resin, triazine resin, melamine resin, cyanate ester resin, and polyphenylene oxide resin or modified resin which is obtained by modification of the same etc. may be mentioned. These can be used alone or in two types or more combined. Among these as well, from the viewpoint of making the obtained laminate one which is small in low dielectric tangent and thereby making it one which is small in transmission loss at a high frequency when applying the laminate to a circuit board, a cycloolefin polymer is preferable. As such a cycloolefin polymer, use of one obtained by ring-opening polymerization of a cycloolefin monomer by a known method is more preferable.

Note that, as the above cross-linkable functional group, for example, an epoxy group, hydroxyl group, isocyanate group, and sulfonic acid group, etc. may be mentioned. Further, in the Description, a cross-linkable carbon-carbon unsaturated bond means a carbon-carbon unsaturated bond which does not participate in the ring-opening polymerization, but can participate in the cross-linking reaction. Note that, the cross-linkable carbon-carbon unsaturated bond will be explained later. Among these cross-linkable functional groups or cross-linkable carbon-carbon unsaturated bond, a cross-linkable carbon-carbon unsaturated bond is preferable.

(Cross-Linking Agent)

The cross-linking agent which is used in the present invention is one which causes a cross-linking reaction in the cross-linkable functional groups or cross-linkable carbon-carbon unsaturated bond which are contained in the heat curable resin so as to generate a cross-linked resin. The cross-linkable resin shaped article of the present invention has the heat curable resin as a matrix resin. Even if heated to melt, it is high in viscosity and holds its shape. On the other hand, when bringing arbitrary member into contact with it, at the surface, it exhibits moldability to the shape of that member and finally cross-links and cures. Such a property of the cross-linkable resin shaped article of the present invention is believed to contribute to the expression of a wire embedding ability and interlayer adhesion in a laminate which is obtained by laminating these and heating them to melt and cross-link.

The above cross-linking agent is not particularly limited, but usually a radical generator is suitably used. As the radical generator, for example, an organic peroxide, diazo compound, nonpolar radical generator, etc. may be mentioned. It is preferably an organic peroxide and nonpolar radical generator.

As the organic peroxide, for example, t-butyl hydroperoxide, p-menthane hydroperoxide, cumene hydroperoxide, and other hydroperoxides; dicumyl peroxide, t-butylcumyl peroxide, α,α'-bis(t-butylperoxy-m-isopropyl)benzene, di-t-butyl peroxide, 2,5-dimethyl-2,5-di(t-butylperoxy)-3-hexine, 2,5-dimethyl-2,5-di(t-butylperoxy)hexane, and other dialkyl peroxides; dipropionyl peroxide, benzoyl peroxide, and other diacyl peroxides; 2,2-di(t-butylperoxy)butane, 1,1-di(t-hexylperoxy)cyclohexane, 1,1-di(t-butylperoxy)-2-methylcyclohexane, 1,1-di(t-butylperoxy)cyclohexane, and other peroxy ketals; t-butyl peroxyacetate, t-butyl peroxybenzoate, and other peroxy esters; t-butylperoxyisopropyl carbonate, di(isopropylperoxy)dicarbonate, and other peroxy carbonates; t-butyltrimethylsilyl peroxide and other alkylsilyl peroxides; 3,3,5,7,7-pentamethyl-1,2,4-trioxepane, 3,6,9-triethyl-3,6,9-trimethyl-1,4,7-triperoxonane, 3,6-diethyl-3,6-dimethyl-1,2,4,5-tetroxane, and other cyclic peroxides; may be mentioned. Among these, dialkyl peroxides, peroxy ketals, and cyclic peroxides are preferable from the viewpoint of little obstruction of the polymerization reaction.

As the diazo compound, for example, 4,4'-bisazidobenzal (4-methyl)cyclohexanone and 2,6-bis(4'-azidobenzal)cyclohexanone etc. may be mentioned.

As the nonpolar radical generator, 2,3-dimethyl-2,3-diphenylbutane, 3,4-dimethyl-3,4-diphenylhexane, 1,1,2-triphenylethane, and 1,1,1-triphenyl-2-phenylethane, etc. may be mentioned.

When using a radical generator as a cross-linking agent, the one-minute half life temperature is suitably selected by the conditions of curing (cross-linking of cross-linkable resin shaped article), but usually is 100 to 300° C., preferably 150 to 250° C., more preferably 160 to 230° C. in range. Here, the one-minute half life temperature is the temperature at which half of the amount of the radical generator breaks down in 1 minute. For the one-minute half life temperature of the radical generator, for example, see the catalog or homepage of the radical generator manufacturer (for example, NOF Corporation).

The above radical generator may be used alone or as two types or more combined. The amount of the radical generator is usually 0.01 to 10 parts by weight with respect to 100 parts by weight of the heat curable resin, preferably 0.1 to 10 parts by weight, more preferably 0.5 to 5 parts by weight in range.

[Condensed Aromatic Polycyclic Compound Which Has (Meth)acryloyloxy Group]

The condensed aromatic polycyclic compound which has a (meth)acryloyloxy group which is used in the present invention is not particularly limited so long as a compound which has a (meth)acryloyloxy group and a condensed aromatic polycyclic structure, but a compound which is shown by the above general formula (1) is preferably used. Note that, in the present invention, a (meth)acryloyloxy group means a methacryloyloxy group and/or acryloyloxy group.

In the general formula (1), "l" and "m" are respectively integers of 0 to 10, preferably 0 to 5, more preferably 0 to 2, at least one of $R^1$ to $R^{12}$ is a substituent which is shown by the formula (2): $-L_p(-M)_n$, a substituent other than the substituent expressed by the formula (2) is at least one elected from the group which is consisted of a hydrogen atom, halogen atom, $C_1$ to $C_{20}$ linear or branched alkyl group, $C_1$ to $C_{20}$ linear or branched alkenyl group, aryl group, and hetero atom-containing group. In $R^1$ to $R^{12}$, the number of substituents which are shown by the formula (2) is preferably 1 to 6, more preferably 2 to 4 due to the excellent solubility in a cycloolefin monomer and reactivity. As the hetero atom-containing group, a hydroxyl group, carboxyl group, aldehyde group, amino group, thiol group, sulfonyl group, or other substituent which contains an oxygen atom, nitrogen atom, sulfur atom, phosphorus atom, silicon atom, halogen atom, or other hetero atom may be mentioned.

In the formula (2), L is a divalent to tetravalent $C_1$ to $C_{20}$ organic group which may contain a hetero atom. As the organic group, a $C_1$ to $C_{20}$ linear or branched alkylene group which may contain a hetero atom, a $C_1$ to $C_{20}$ linear or branched alkenylene group which may contain a hetero atom, an arylene group, etc. may be mentioned. As the hetero atom, for example, an oxygen atom, nitrogen atom, sulfur atom, phosphorus atom, silicon atom, and halogen atom may be mentioned. M is a (meth)acryloyloxy group, while "n" is an integer of 1 to 3. Further, "p" is 0 or 1. When "p" is 0, the (meth)acryloyloxy group is directly bonded with the condensed aromatic ring.

As the compound which is shown by the general formula (1), among these, due to the excellent solubility in a cycloolefin monomer, compounds which are shown by the following formula (3) to (10) are preferable.

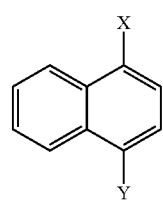

(3)

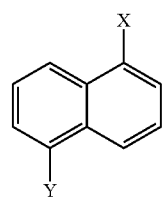

(4)

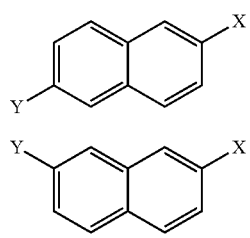

(5)

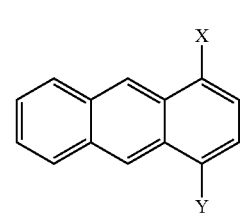

(6)

(7)

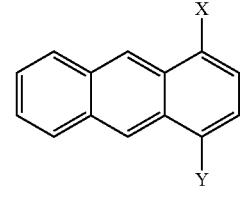

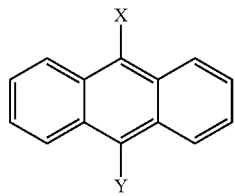

(8)

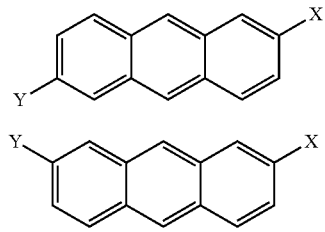

(9)

(10)

In the compounds which are shown in the above formulas (3) to (10), one or both of X and Y are a substituent which is shown by the formula (2). When either of X and Y is a substituent other than a substituent which is shown by the formula (2), that substituent is at least one selected from the group consisted of a hydrogen atom, halogen atom, $C_1$ to $C_{20}$ linear or branched alkyl group, $C_1$ to $C_m$ linear or branched alkenyl group, aryl group, and hetero atom-containing group. The hetero atom-containing group is similar to that of the general formula (1). As the compounds which are shown by the above formulas (3) to (10), since the reactivity and electrical characteristics are excellent, one where both of X and Y are substituents which are shown in the formula (2) is preferable.

As specific examples of the substituent which is shown by the formula (2), substituents which are shown by the following such formulas (11) to (17) may be mentioned.

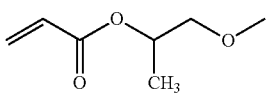

(11)

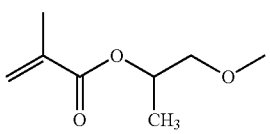

(12)

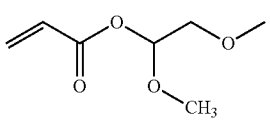

(13)

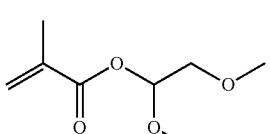

(14)

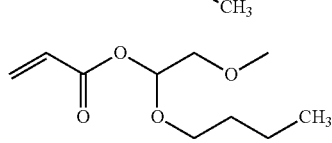

(15)

-continued

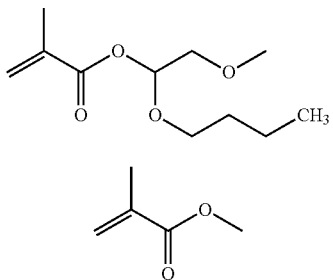

As the compound which is shown by the above such general formula (1), for example, the ones which are described in Japanese Patent Publication No. 2008-1641A, Japanese Patent Publication No. 2008-81682A, Japanese Patent Publication No. 2008-88132A, Japanese Patent Publication No. 2008-169156A, etc. may be mentioned. Specifically, the following such compounds may be mentioned:

1-acryloyloxynaphthalene, 2-acryloyloxynaphthalene, 1-methacryloyloxynaphthalene, 2-methacryloyloxynaphthalene, 4-methoxy-1-acryloyloxynaphthalene, 4-methoxy-1-methacryloyloxynaphthalene, and other naphthalenes which have single (meth)acryloyloxy group;

5-(2-acryloyloxyethoxy)anthracene, 5-(2-methacryloyloxyethoxy)anthracene, 5-(2-acryloyloxypropoxy)anthracene, 5-(2-methacryloyloxypropoxy)anthracene, 5-(2-acryloyloxybutoxy)anthracene, 5-(2-methacryloyloxybutoxy)anthracene, and other anthracenes which have single (meth)acryloyloxy group;

1,4-diacryloyloxynaphthalene, 1,6-diacryloyloxynaphthalene, 2,7-diacryloyloxynaphthalene, 2,6-diacryloyloxynaphthalene, 1,5-diacryloyloxynaphthalene, 1,4-dimethacryloyloxynaphthalene, 1,6-dimethacryloyloxynaphthalene, 2,7-dimethacryloyloxynaphthalene, 2,6-dimethacryloyloxynaphthalene, 1,5-dimethacryloyloxynaphthalene, 2-methyl-1,4-diacryloyloxynaphthalene, 2-chloro-1,4-diacryloyloxynaphthalene, 2-methoxy-1,4-diacryloyloxynaphthalene, 2,6-bis(2-acryloyloxyethoxy)naphthalene, 2,6-bis(2-methacryloyloxyethoxy)naphthalene, 2,6-bis(2-acryloyloxypropoxy)naphthalene, 2,6-bis(2-methacryloyloxypropoxy)naphthalene, 2,6-bis(2-acryloyloxybutoxy)naphthalene, 2,6-bis(2-methacryloyloxybutoxy) naphthalene, and other naphthalenes which have two (meth)acryloyloxy groups;

1,4-diacryloyloxyanthracene, 9,10-diacryloyloxyanthracene, 2,6-diacryloyloxyanthracene, 2,7-diacryloyloxyanthracene, 1,4-dimethacryloyloxyanthracene, 9,10-dimethacryloyloxyanthracene, 2,6-dimethacryloyloxyanthracene, 2,7-dimethacryloyloxyanthracene, 2-chloro-1,4-diacryloyloxyanthracene, 2-methoxy-1,4-diacryloyloxyanthracene, 1,4-bis(2-acryloyloxyethoxy)anthracene, 1,4-bis(2-methacryloyloxyethoxy) anthracene, 9,10-bis(2-methacryloyloxyethoxy)anthracene, 1,4-bis(2-acryloyloxypropoxy)anthracene, 1,4-bis(2-methacryloyloxypropoxy)anthracene, 2,6-bis(2-acryloyloxypropoxy)anthracene, 2,7-bis(2-methacryloyloxypropoxy)anthracene, 1,4-bis(2-acryloyloxybutoxy)anthracene, 1,4-bis(2-methacryloyloxybutoxy)anthracene, 9,10-bis(2-methacryloyloxybutoxy)anthracene, 2,6-bis(2-acryloyloxybutoxy)anthracene, 2,7-bis(2-methacryloyloxybutoxy)anthracene, and other anthracenes which have two (meth)acryloyloxy groups; etc. may be mentioned.

Among these, since the solubility in and reactivity with a cycloolefin monomer is excellent, 1,4-diacryloyloxynaphthalene, 1,6-diacryloyloxynaphthalene, 2,7-diacryloyloxynaphthalene, 2,6-diacryloyloxynaphthalene, 1,5-diacryloyloxynaphthalene, 1,4-dimethacryloyloxynaphthalene, 1,6-dimethacryloyloxynaphthalene, 2,7-dimethacryloyloxynaphthalene, 2,6-dimethacryloyloxynaphthalene, 1,5-dimethacryloyloxynaphthalene, 2-methyl-1,4-diacryloyloxynaphthalene, 2,6-bis(2-acryloyloxyethoxy) naphthalene, 2,6-bis(2-methacryloyloxyethoxy) naphthalene, 2,6-bis(2-acryloyloxypropoxy)naphthalene, 2,6-bis(2-methacryloyloxypropoxy)naphthalene, 2,6-bis(2-acryloyloxybutoxy)naphthalene, 2,6-bis(2-methacryloyloxybutoxy)naphthalene, or other naphthalenes which do not have halogen atoms and have two (meth)acryloyloxy groups;

1,4-diacryloyloxyanthracene, 9,10-diacryloyloxyanthracene, 2,6-diacryloyloxyanthracene, 2,7-diacryloyloxyanthracene, 1,4-dimethacryloyloxyanthracene, 9,10-dimethacryloyloxyanthracene, 1,4-bis(2-acryloyloxyethoxy)anthracene, 1,4-bis(2-methacryloyloxyethoxy)anthracene, 9,10-bis(2-methacryloyloxyethoxy)anthracene, 1,4-bis(2-acryloyloxypropoxy)anthracene, 1,4-bis(2-methacryloyloxypropoxy)anthracene, 2,6-bis(2-acryloyloxypropoxy)anthracene, 2,7-bis(2-methacryloyloxypropoxy)anthracene, 1,4-bis(2-acryloyloxybutoxy)anthracene, 1,4-bis(2-methacryloyloxybutoxy)anthracene, 9,10-bis(2-methacryloyloxybutoxy)anthracene, and other anthracenes which do not have halogen atoms and have two (meth)acryloyloxy groups;
are preferable, 1,4-diacryloyloxynaphthalene, 1,4-dimethacryloyloxynaphthalene, 1,4-diacryloyloxyanthracene, 1,4-dimethacryloyloxyanthracene, 9,10-diacryloyloxyanthracene, 9,10-dimethacryloyloxyanthracene, 1,4-bis(2-acryloyloxyethoxy)anthracene, 1,4-bis(2-methacryloyloxyethoxy)anthracene, 1,4-bis(2-acryloyloxypropoxy)anthracene, 1,4-bis(2-methacryloyloxypropoxy)anthracene, 1,4-bis(2-acryloyloxybutoxy)anthracene, 1,4-bis(2-methacryloyloxybutoxy)anthracene
are more preferable, 1,4-dimethacryloyloxynaphthalene, 1,4-dimethacryloyloxyanthracene, 9,10-dimethacryloyloxyanthracene, 1,4-bis(2-methacryloyloxyethoxy)anthracene, 1,4-bis(2-methacryloyloxypropoxy)anthracene, and other naphthalenes which do not have halogen atoms and have (meth)acryloyloxy groups at the two 1- and 4-positions, and anthracenes which do not have halogen atoms and have (meth)acryloyloxy groups at the two 1- and 4- or 9- and 10-positions are preferable.

The condensed aromatic polycyclic compound which has the above (meth)acryloyloxy group may be used alone or as two types or more combined. The amount of the condensed aromatic polycyclic compound which has a (meth)acryloyloxy group is usually 0.1 to 100 parts by weight with respect to 100 parts by weight of the heat curable resin, preferably 1 to 50 parts by weight, more preferably 5 to 25 parts by weight in range. If the amount of the condensed aromatic polycyclic compound which has a (meth)acryloyloxy group is too small, the obtained laminate is liable to fall in heat resistance and to become higher in linear expansion coefficient and fall in reliability. On the other hand, if too great, the obtained laminate is liable to become hard and brittle.

(Cross-Linkable Resin Shaped Article)

When the heat curable resin which constitutes the cross-linkable resin shaped article is a cycloolefin polymer, the cross-linkable resin shaped article of the present invention is preferably obtained by bulk polymerization of a polymerizable composition which contains a cycloolefin monomer, metathesis polymerization catalyst, the above-mentioned cross-linking agent, and the above-mentioned condensed aromatic polycyclic compound which has a (meth)acryloyloxy group.

The cycloolefin monomer which configures the polymerizable composition which is used in the present invention is a compound which has at least one alicyclic structure formed by carbon atoms and which has one ring-opening polymerizable carbon-carbon double bond at least at one of the alicyclic structures.

As the alicyclic structure of the cycloolefin monomer, a monocyclic, polycyclic, condensed polycyclic, bridged cyclic, and combined polycyclic structures of these may be mentioned. The number of carbon atoms which configure the alicyclic structures is not particularly limited, but is usually 4 to 30, preferably 5 to 20, more preferably 5 to 15.

The cycloolefin monomer may have an alkyl group, alkenyl group, alkylidene group, aryl group, or other $C_1$ to $C_{30}$ hydrocarbon group or carboxyl group or acid anhydride group or other polar group as a substituent, but from the viewpoint of making the obtained laminate low in dielectric tangent, one which does not have a polar group, that is, one which is constituted by only carbon atoms and hydrogen atoms, is preferable.

As the cycloolefin monomer, either of a monocyclic cycloolefin monomer and polycyclic cycloolefin monomer may be used. From the viewpoint of balancing the dielectric characteristic and heat resistance of the obtained laminate to a high degree, a polycyclic cycloolefin monomer is preferable. As a polycyclic cycloolefin monomer, in particular a norbornene-based monomer is preferable. A "norbornene-based monomer" means a cycloolefin monomer which has norbornene ring structure in its molecule. For example, norbornenes, dicyclopentadienes, tetracyclododecenes, etc. may be mentioned.

As the cycloolefin monomer, it is possible to use either one which does not have cross-linkable carbon-carbon unsaturated bonds or one which has one or more cross-linkable carbon-carbon unsaturated bonds. In this Description, "cross-linkable carbon-carbon unsaturated bond" means a carbon-carbon unsaturated bond which does not participate in the ring-opening polymerization, but can participate in the cross-linking reaction. A cross-linking reaction is a reaction which forms a cross-linked structure. There are a condensation reaction, addition reaction, radical reaction, metathesis reaction, or various other types of reactions, but in the present invention, usually it means a radical cross-linking reaction or metathesis cross-linking reaction, in particular a radical cross-linking reaction. As the cross-linkable carbon-carbon unsaturated bond, a carbon-carbon unsaturated bond other than an aromatic carbon-carbon unsaturated bond, that is, an aliphatic carbon-carbon double bond or triple bond, may be mentioned. In the present invention, usually it means an aliphatic carbon-carbon double bond. The position of the unsaturated bond in the cycloolefin monomer which has at least one cross-linkable carbon-carbon unsaturated bond is not particularly limited. In addition to inside the alicyclic structure which is formed by carbon atoms, it may be present at arbitrary position other than the alicyclic structure, for example, at the end or inside of a side chain. For example, an aliphatic carbon-carbon double bond may be present as a vinyl group ($CH_2$=CH—), vinylidene group ($CH_2$=C<), or vinylene group (—CH=CH—) and exhibits an excellent radical cross-linkability, so is preferably present as a vinyl group and/or vinylidene group and is more particularly preferably present as a vinylidene group.

As the cycloolefin monomer which does not have a cross-linkable carbon-carbon unsaturated bond, for example, cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene, cycloheptene, and other monocyclic cycloolefin monomers; norbornene, 5-methyl-2-norbornene, 5-ethyl-2-norbornene, 5-propyl-2-norbornene, 5,6-dimethyl-2-norbornene, 1-methyl-2-norbornene, 7-methyl-2-norbornene, 5,5,6-trimethyl-2-norbornene, 5-phenyl-2-norbornene, tetracyclododecene, 1,4,5,8-dimethano-1,2,3,4,4a,5,8,8a-octahydronaphthalene (TCD), 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrodicyclopentadiene and also 5-chloro-2-norbornene, 5,5-dichloro-2-norbornene, 5-fluoro-2-norbornene, 5,5,6-trifluoro-6-trifluoromethyl-2-norbornene, 5-chloromethyl-2-norbornene, 5-methoxy-2-norbornene, 5,6-dicarboxyl-2-norbornene anhydrate, 5-dimethylamino-2-norbornene, 5-cyano-2-norbornene, and other norbornene-based monomers; may be mentioned. Preferably, it is a norbornene-based monomer which does not have a cross-linkable carbon-carbon unsaturated bond.

As the cycloolefin monomer which has one or more cross-linkable carbon-carbon unsaturated bonds, for example, 3-vinylcyclohexene, 4-vinylcyclohexene, 1,3-cyclopentadiene, 1,3-cyclohexadiene, 1,4-cyclohexadiene, 5-ethyl-1,3-cyclohexadiene, 1,3-cycloheptadiene, 1,3-cyclooctadiene, and other monocyclic cycloolefin monomers which have one or more cross-linkable carbon-carbon unsaturated bonds; 5-ethylidene-2-norbornene, 5-methylidene-2-norbornene, 5-isopropylidene-2-norbornene, 5-vinyl-2-norbornene, 5-allyl-2-norbornene, 5,6-diethylidene-2-norbornene, dicyclopentadiene, 2,5-norbornadiene, and other norbornene-based monomers which have one or more cross-linkable carbon-carbon unsaturated bonds; may be mentioned. Preferably, it is a norbornene-based monomer which has one or more cross-linkable carbon-carbon unsaturated bonds.

These cycloolefin monomers may be used alone or in two types or more combined.

As the cycloolefin monomer which is used in the present invention, one which includes a cycloolefin monomer which has one or more cross-linkable carbon-carbon unsaturated bonds is preferable. If using such a cycloolefin monomer, the obtained laminate is improved in crack resistance and other aspects of reliability, so this is preferred.

In the cycloolefin monomer for forming the cycloolefin polymer, the ratio of mixture of the cycloolefin monomer which has one or more cross-linkable carbon-carbon unsaturated bonds and the cycloolefin monomer which does not have a cross-linkable carbon-carbon unsaturated bond should be suitably selected as desired, but in terms of weight ratio (cycloolefin monomer which has one or more cross-linkable carbon-carbon unsaturated bonds/cycloolefin monomer which does not have a cross-linkable carbon-carbon unsaturated bond) is usually 5/95 to 100/0, preferably 10/90 to 90/10, more preferably 15/85 to 70/30 in range. If this ratio of mixture is in this range, in the obtained laminate, the heat resistance, the crack resistance, and other properties can be improved to a high degree, so this is preferable.

Note that, the polymerizable composition may include arbitrary monomer which can copolymerize with the above-mentioned cycloolefin monomer so long as the expression of the advantageous effect of the present invention is not impaired.

As the metathesis polymerization catalyst which constitutes the polymerizable composition, a complex which can cause metathesis polymerization of the above-mentioned cycloolefin monomer, which usually has a transition metal atom as its center atom, and has a plurality of ions, atoms, polyatomic ions, and compounds etc. bonded to it may be mentioned. As the transition metal atom, an atom of Group V, Group VI, and Group VIII (according to long Periodic Table, same below) is used. The atoms of the groups are not particularly limited, but as the atom of Group V, for example, tantalum may be mentioned, as the atom of Group VI, for example, molybdenum or tungsten may be mentioned, and as the atom of Group VIII, for example, ruthenium or osmium may be mentioned. Among the transition metal atoms, ruthenium or osmium of Group VIII is preferable. That is, as the metathesis polymerization catalyst which is used in the present invention, a complex which has ruthenium or osmium as a central atom is preferable, while a complex which has ruthenium as a central atom is more preferable. As a complex which has ruthenium as a central atom, a ruthenium carbene complex which is comprised of a carbene compound bonded with ruthenium is preferable. Here, "carbene compound" is a general term for compounds which have methylene free radicals and means a compound which has a divalent carbon atom (carbene carbon) with no charge such as expressed by (>C:). A ruthenium carbene complex is excellent in catalytic activity at the time of bulk polymerization, so when bulk polymerizing a polymerizable composition, there is little odor due to unreacted monomer and a good quality shaped article can be obtained with good productivity. Further, it is relatively stable with respect to oxygen and the moisture in the air and is resistant to deactivation, so can be used even in the atmosphere.

As specific examples of a ruthenium carbene complex, a complex which is expressed by the following general formula (I) or (II) may be mentioned.

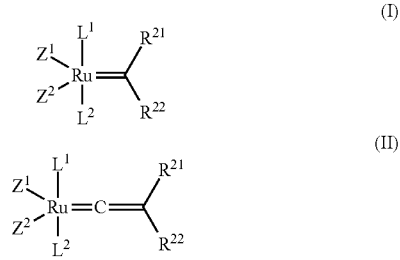

In the above general formulas (I) and (II), $R^{21}$ and $R^{22}$ may independently contain a hydrogen atom, halogen atom, or cyclic or chain $C_1$ to $C_{20}$ hydrocarbon group which may contain a halogen atom, oxygen atom, nitrogen atom, sulfur atom, phosphorus atom, or silicon atom. $Z^1$ and $Z^2$ respectively independently indicate arbitrary anionic ligand. $L^1$ and $L^2$ respectively independently indicate a hetero atom-containing carbene compound or a neutral electron donor compound other than a hetero atom-containing carbene compound. Further, $R^{21}$ and $R^{22}$ may bond with each other to form an aliphatic ring or aromatic ring which may contain a hetero atom. Furthermore, $R^{21}$, $R^{22}$, $Z^1$, $L^1$, and $L^2$ may bond with each other in any combinations to form polydentate chelated ligands.

The "hetero atom" means atoms of Group XV and Group XVI of the Periodic Table. Specifically, a nitrogen atom (N), oxygen atom (O), phosphorus atom (P), sulfur atom (5), arsenic atom (As), selenium atom (Se), etc. may be mentioned. Among these, from the viewpoint of a stable carbene compound being obtained, N, O, P, S, etc. are preferable, while N is particularly preferable.

As the above ruthenium carbene complex, due to the ability of the obtained laminate to be balanced in mechanical properties and impact resistance to a high degree, one which has, as a ligand, at least one carbene compound which has a heterocyclic structure as a hetero atom containing carbene compound is preferable. As the heterocyclic structure, an imidazoline cyclic structure or imidazolidine cyclic structure is preferable.

As a carbene compound which has a heterocyclic structure, a compound which is shown by the following general formula (III) or (IV) may be mentioned.

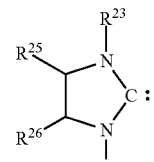

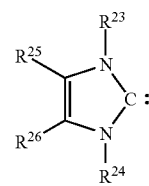

where, in the above general formulas (III) and (IV), $R^{23}$ to $R^{26}$ respectively independently indicate a hydrogen atom; halogen atom; or cyclic or chain $C_1$ to $C_{20}$ hydrocarbon group which may contain a halogen atom, oxygen atom, nitrogen atom, sulfur atom, phosphorus atom, or silicon atom. Further, $R^{23}$ to $R^{26}$ may be bonded with each other in arbitrary combination to form a ring.

As the compound which is expressed by the above general formula (III) or (IV), 1,3-dimesitylimidazolidin-2-ylidene, 1,3-di(1-adamantyl)imidazolidin-2-ylidene, 1,3-dicyclohexylimidazolidin-2-ylidene, 1,3-dimesityloctahydrobenzimidazol-2-ylidene, 1,3-diisopropyl-4-imidazolin-2-ylidene, 1,3-di(1-phenylethyl)-4-imidazolin-2-ylidene, 1,3-dimesityl-2,3-dihydrobenzimidazol-2-ylidene, etc. may be mentioned.

Further, in addition to the compound which is shown by the above general formula (III) or (IV), 1,3,4-triphenyl-2,3,4,5-tetrahydro-1H-1,2,4-triazol-5-ylidene, 1,3-dicyclohexylhexahydropyrimidin-2-ylidene, N,N,N',N'-tetraisopropylformamidinylidene, 1,3,4-triphenyl-4,5-dihydro-1H-1,2,4-triazol-5-ylidene, 3-(2,6-diisopropylphenyl)-2,3-dihydrothiazol-2-ylidene, and other hetero atom-containing carbene compounds may be used.

In the above general formulas (I) and (II), the anionic (negative ionic) ligands $Z^1$ and $Z^2$ are ligands which have negative charges when separated from the central metal atoms. For example, a fluorine atom (F), chlorine atom (Cl), bromine atom (Br), iodine atom (I), and other halogen atom, a diketonate group, substituted cyclopentadienyl group, alkoxy group, aryloxy group, carboxyl group, etc. may be mentioned. Among these, halogen atoms are preferable and a chlorine atom is more preferable.

Further, the neutral electron donor compound may be any so long as a ligand which has a neutral charge when separated from the central metal. As specific examples, carbonyls, amines, pyridines, ethers, nitriles, esters, phosphines, thioethers, aromatic compounds, olefins, isocyanides, thiocyanates, etc. may be mentioned. Among these, phosphines, ethers, and pyridines are preferable and trialkyl phosphine is more preferable.

As the complex compound which is expressed by the above general formula (1), benzylidene(1,3-dimesityl-4-imidazolidine-2-ylidene) (tricyclohexylphosphine)ruthenium dichloride, benzylidene(1,3-dimesityl-4,5-dibromo-4-imidazoline-2-ylidene) (tricyclohexylphosphine)ruthenium dichloride, (1,3-dimesityl-4-imidazoline-2-ylidene) (3-phenyl-1H-indene-1-ylidene)(tricyclohexylphosphine)ruthenium dichloride, (1,3-dimesitylimidazolidine-2-ylidene) (3-methyl-2-butene-1-ylidene) (tricyclopentylphosphine)ruthenium dichloride, benzylidene(1,3-dimesityl-octahydrobenzimidazole-2-ylidene) (tricyclohexylphosphine) ruthenium dichloride, benzylidene[1,3-phenylethyl)-4-imidazoline-2-ylidene](tricyclohexylphosphine)ruthenium dichloride, benzylidene(1,3-dimesityl-2,3-dihydrobenzimidazole-2-ylidene)(tricyclohexylphosphine) ruthenium dichloride, benzylidene(tricyclohexylphosphine) (1,3,4-triphenyl-2,3,4,5-tetrahydro-1H-1,2,4-triazole-5-ylidene)ruthenium dichloride, (1,3-diisopropylhexahydropyrimidine-2-ylidene) (ethoxymethylene)(tricyclohexylphosphine)ruthenium dichloride, benzylidene(1,3-dimesitylimidazolidine-2-ylidene)pyridine ruthenium dichloride, (1,3-dimesitylimidazolidine-2-ylidene) (2-phenylethylidene) (tricyclohexylphosphine)ruthenium dichloride, (1,3-dimesityl-4-imidazoline-2-ylidene) (2-phenylethylidene) (tricyclohexylphosphine) ruthenium dichloride, (1,3-dimesityl-4,5-dibromo-4-imidazoline-2-ylidene) [(phenylthio)methylene](tricyclohexylphosphine)ruthenium dichloride, (1,3-dimesityl-4,5-dibromo-4-imidazoline-2-ylidene) (2-pyrrolidone-1-ylmethylene) (tricyclohexylphosphine)ruthenium dichloride, and other ruthenium complex compounds comprising one hetero atom-containing carbene compound and one neutral electron donor compound bonded to ruthenium;

benzylidene bis(tricyclohexylphosphine)ruthenium dichloride, (3-methyl-2-butene-1-ylidene)bis(tricyclopentylphosphine)ruthenium dichloride, and other ruthenium compounds to which two neutral electron donor compounds are bonded;

benzylidenebis(1,3-dicyclohexylimidazolidin-2-ylidene) ruthenium dichloride, benzylidenebis(1,3-diisopropyl-4-imidazolin-2-ylidene)ruthenium dichloride, and other ruthenium compounds comprising two neutral electron donor compounds bonded to ruthenium; etc. may be mentioned.

As the complex compound which is expressed by the above general formula (II), (1,3-dimesitylimidazolidine-2-ylidene) (phenylvinylidene) (tricyclohexylphosphine)ruthenium dichloride, (t-butylvinylidene) (1,3-diisopropyl-4-imidazoline-2-ylidene) (tricyclopentylphosphine)ruthenium dichloride, bis(1,3-dicyclohexyl-4-imidazoline-2-ylidene)phenylvinylidene ruthenium dichloride, etc. may be mentioned.

Among these complex compounds, one which is expressed by the above general formula (I) and which has one compound expressed by the above general formula (IV) as a ligand is most preferable.

These ruthenium carbene complexes can be produced by the methods described in Org. Lett., 1999, vol. 1, page 953, Tetrahedron. Lett., 1999, vol. 40, page 2247, etc.

The metathesis polymerization catalyst can be used alone or in two types or more combined. The amount of use of the metathesis polymerization catalyst is, for example, in terms of molar ratio (metal atom in metathesis polymerization catalyst:cycloolefin monomer), usually 1:2,000 to 1:2,000,000, preferably 1:5,000 to 1:1,000,000, more preferably 1:10,000 to 1:500,000 in range.

The metathesis polymerization catalyst can, as desired, be used dissolved or suspended in a small amount of inert solvent. As such a solvent, n-pentane, n-hexane, n-heptane, liquid paraffin, a mineral spirits, or other chain aliphatic hydrocarbon; cyclopentane, cyclohexane, methylcyclohexane, dimethylcyclohexane, trimethylcyclohexane, ethyl cyclohexane, diethylcyclohexane, decahydronaphthalene, dicycloheptane, tricyclodecane, hexahydroindene, cyclooctane, and other alicyclic hydrocarbons; benzene, toluene, xylene, and other aromatic hydrocarbons; indene, tetrahydronaphthalene, and other hydrocarbons which have an alicyclic ring and aromatic ring; nitromethane, nitrobenzene, acetonitrile, and other nitrogen-containing hydrocarbons; diethylether, tetrahydrofuran, and other oxygen-containing hydrocarbons; etc. may be mentioned. Among these, chain aliphatic hydrocarbons, alicyclic hydrocarbons, aromatic hydrocarbons, and hydrocarbons which have an alicyclic ring and aromatic ring are preferably used.

Further, the polymerizable composition which is used in the present invention may have added to it, in addition to the above ingredients, as desired, a cross-linking aid, filler, polymerization adjuster, polymerization reaction retarder, chain transfer agent, antiaging agent, and other compounding agents.

As the cross-linking aid, a polyfunctional compound which does not participate in the polymerization reaction but can participate in the cross-linking reaction which is induced by the cross-linking agent is suitably used. Such a cross-linkable carbon-carbon unsaturated bond is preferably present in the compound which forms the cross-linking aid as, for example, an end vinylidene group, in particular as an isopropenyl group or a methacryl group.

As specific examples of the cross-linking aid, p-diisopropenylbenzene, m-diisopropenylbenzene, o-diisopropenylbenzene, or other polyfunctional compounds which have two or more isopropenyl groups; ethylene dimethacrylate, 1,3-butylene dimethacrylate, 1,4-butylene dimethacrylate, 1,6-hexanediol dimethacrylate, polyethyleneglycol dimethacrylate, ethyleneglycol dimethacrylate, triethyleneglycol dimethacrylate, diethyleneglycol dimethacrylate, 2,2'-bis(4-methacryloxydiethoxyphenyl)propane, trimethylolpropane trimethacrylate, pentaerythritol trimethacrylate, and other polyfunctional compounds which have two or more methacryl groups (except a condensed aromatic polycyclic compound which has (meth)acryloyloxy groups), etc. may be mentioned. Among these, as the cross-linking aid, polyfunctional compounds which have two or more methacryl groups (except a condensed aromatic polycyclic compound which has a (meth)acryloyloxy group) are preferable. Among the polyfunctional compounds which have two or more methacryl groups, in particular, trimethylolpropane trimethacrylate, pentaerythritol trimethacrylate, and other polyfunctional compounds which have three methacryl groups are particularly suitable.

These cross-linking aids may be used alone or as two types or more combined. The amount of the cross-linking aid is usually 0.1 to 100 parts by weight with respect to 100 parts by weight of the cycloolefin monomer, preferably 0.5 to 50 parts by weight, more preferably 1 to 30 parts by weight.

The filler has the action of balancing the mechanical properties, heat resistance, chemical resistance, and other properties of the obtained laminate. The filler is not particularly limited so long as one which is industrially generally used. Either an inorganic filler or organic filler may be used, but an inorganic filler is preferable.

As inorganic fillers, for example, iron, copper, nickel, gold, silver, aluminum, lead, tungsten, and other metal particles; carbon black, graphite, activated charcoal, carbon balloons, and other carbon particles; silica, silica balloons, alumina, titanium oxide, iron oxide, zinc oxide, magnesium oxide, stannous oxide, beryllium oxide, barium ferrite, strontium ferrite, and other inorganic oxide particles; calcium carbonate, magnesium carbonate, sodium hydrogen carbonate, and other inorganic carbonate particles; calcium sulfate and other inorganic sulfate particles; talc, clay, mica, kaolin, fly ash, montmorillonite, calcium silicate, glass, glass balloons, and other inorganic silicate particles; calcium titanate, lead zirconate titanate, and other titanate particles; aluminum nitride; silicon carbide particles; whiskers; etc. may be mentioned.

As organic fillers, for example, wood flour, starch, organic pigments, polystyrene, nylon, polyethylene, polypropylene, or other polyolefins, vinyl chloride, scrap plastic, and other particle compounds may be mentioned.

These fillers may be used alone or as two types or more combined. The amount of the filler is usually 50 parts by weight or more with respect to 100 parts by weight of the cycloolefin monomer, preferably 50 to 1,000 parts by weight, more preferably 50 to 750 parts by weight, furthermore preferably 50 to 500 parts by weight in range. Further, these fillers may be treated on their surfaces by a silane coupling agent, titanate coupling agent, aluminate coupling agent, fatty acid, or other known surface treatment agent. If the amount of filler is in this range, it is possible to balance the mechanical properties, heat resistance, chemical resistance, and other properties of the obtained laminate to a high degree, so this is preferred.

The chain transfer agent has the action of improving the moldability of the resin at the time of heating and melting at the surface of the cross-linkable resin shaped article which is obtained by polymerization of the polymerizable composition.

As specific examples of the chain transfer agent, 1-hexene, 2-hexene, styrene, vinylcyclohexane, allylamine, glycidyl acrylate, allylglycidyl ether, ethylvinyl ether, methylvinylketone, 2-(diethylamino)ethyl acrylate, 4-vinylaniline, and other chain transfer agents which do not have cross-linkable carbon-carbon unsaturated bonds; divinylbenzene, vinyl methacrylate, allyl methacrylate, styryl methacrylate, allyl acrylate, undecenyl methacrylate, styryl acrylate, ethyleneglycol diacrylate, and other chain transfer agents which have single cross-linkable carbon-carbon unsaturated bond; allyltrivinylsilane, allylmethyldivinylsilane, and other chain transfer agents which have two or more cross-linkable carbon-carbon unsaturated bonds, etc. may be mentioned. Among these, from the viewpoint of balancing the wire embedding ability, heat resistance, crack resistance, and other properties in the obtained laminate to a high degree, one which has at least one cross-linkable carbon-carbon unsaturated bond is preferable and one which has a single cross-linkable carbon-carbon unsaturated bond is more preferable. Among these chain transfer agents, a chain transfer agent which has one vinyl group and one methacryl group each is preferable, while vinyl methacrylate, allyl methacrylate, styryl methacrylate, undecenyl methacrylate, etc. are particularly preferred.

These chain transfer agents may be used respectively independently or as two types or more combined. The amount of the chain transfer agent is usually 0.01 to 10 parts by weight with respect to 100 parts by weight of the cycloolefin monomer, preferably 0.1 to 5 parts by weight.

As the antiaging agent, at least one type of antiaging agent which is selected from the group consisted of a phenol-based antiaging agent, amine-based antiaging agent, phosphorus-based antiaging agent, and sulfur-based antiaging agent is suitable since it does not obstruct the cross-linking reaction and can improve the heat resistance of the obtained laminate to a high degree. Among these, a phenol-based antiaging agent and an amine-based antiaging agent are preferable, while a phenol-based antiaging agent is more preferable. These antiaging agents may be used respectively independently or as two types or more combined. The amount of the antiaging agent used is suitably selected as desired, but is usually 0.0001 to 10 parts by weight with respect to 100 parts by weight of the cycloolefin monomer, preferably 0.001 to 5 parts by weight, more preferably 0.01 to 2 parts by weight in range.

The polymerizable composition which can be used for the present invention can be obtained by mixing the above ingredients. As the mixing method, it is possible to follow an ordinary method. For example, it can be prepared by dissolving or dispersing a metathesis polymerization catalyst in a suitable solvent to prepare a solution (catalyst solution), separately mixing a cycloolefin monomer, cross-linking agent, condensed aromatic polycyclic compound which has a (meth)acryloyloxy group, and as desired other compounding agents etc. to prepare a solution (monomer solution), adding the catalyst solution to the monomer solution, and stirring.

Note that, when blending into the polymerizable composition which is used for production of the cross-linkable resin shaped article of the present invention, a compounding agent other than a cycloolefin monomer, metathesis polymerization catalyst, cross-linking agent, and condensed aromatic polycyclic compound which has a (meth)acryloyloxy group, these compounding agents are also included in the cross-linkable resin shaped article of the present invention.

Further, as the method for bulk polymerizing the above-mentioned polymerizable composition to obtain the cross-linkable resin shaped article of the present invention, for example, (a) the method of coating the polymerizable composition on a support, then bulk polymerizing it, (b) the method of injecting the polymerizable composition into a mold, then bulk polymerizing it, (c) the method of impregnating the polymerizable composition in a fiber reinforcing material, then bulk polymerizing it, etc. may be mentioned.

According to the method of the above (a), a film-shaped or sheet-shaped cross-linkable resin shaped article is obtained. The cross-linkable resin shaped article has a thickness of usually 15 mm or less, preferably 5 mm or less, more preferably 0.5 mm or less, furthermore preferably 0.1 mum or less. As the support, for example, a film or sheet which is comprised of polytetrafluoroethylene, polyethylene terephthalate, polypropylene, polyethylene, polycarbonate, polyethylene naphthalate, polyacrylate, nylon, or other resin; a film or sheet which is comprised of iron, stainless steel, copper, aluminum, nickel, chromium, gold, silver, or other metal material; etc. may be mentioned. Among these, a metal foil or resin film is preferably used. The metal foil or resin film has a thickness, from the viewpoint of the work efficiency etc., of usually 1 to 150 μm, preferably 2 to 100 μm, more preferably 3 to 75 μm. As the metal foil, one with a surface which is smooth is preferable. The surface roughness (Rz) is, in terms of the value which is measured by an AFM (atomic force microscope), usually 10 μm or less, preferably 5 μm or less, more preferably 3 μm or less, furthermore preferably 2 μm or less. If the surface roughness of the metal foil is in the above range, when using the cross-linkable resin shaped article of the present invention to obtain a high frequency circuit board, occurrence of noise, delay, transmission loss, etc. at the high frequency transmission is suppressed, so this is preferred. Further, the surface of the metal foil is preferably treated by a silane coupling agent, thiol coupling agent, titanate coupling agent, or other known coupling agent or adhesive agent etc. According to the method of (a), for example, if using a support comprised of copper foil, resin coated copper (RCC) can be obtained.

As the method of coating the support with a polymerizable composition, the spray coat method, dip coat method, roll coat method, curtain coat method, die coat method, slit coat method, or other known coating method may be mentioned.

Further, the polymerizable composition which is coated on the support is dried as desired, then bulk polymerized. The bulk polymerization is performed by heating the polymerizable composition at a predetermined temperature. The heating method of the polymerizable composition is not particularly limited. The method of heating the polymerizable composition which is coated on the support by placing it on a hot plate, the method of using a press to apply pressure and heat (hot press), the method of pressing by a heated roller, the method of heating in a heating oven, etc. may be mentioned.

According to the method of the above (b), it is possible to obtain a cross-linkable resin shaped article of arbitrary shape. As the shape, a sheet shape, film shape, columnar shape, cylindrical shape, prismatic shape, etc. may be mentioned.

As the mold which is used here, a conventionally known mold, for example, a mold which has a split mold structure, that is, has a core mold and a cavity mold, can be used. The polymerizable composition is charged in the cavity to cause bulk polymerization. The core mold and the cavity mold are fabricated so as to form a cavity which matches the shape of the target article. The mold is not particularly limited in shape, material, size, etc. Furthermore, by preparing glass sheets or metal sheets or other plate-shaped molds and spacers of predetermined thicknesses, placing the spacers between the two plate-shaped molds, and filling the polymerizable composition inside the formed space and bulk polymerizing it, it is possible to obtain a sheet shaped or film shaped cross-linkable resin shaped article.

The filling pressure when filling the polymerizable composition in the mold cavity is usually 0.01 to 10 MPa, preferably 0.02 to 5 MPa. If the filling pressure is too low, the transfer surface which is formed at the inner circumferential surface of the cavity tends to not be transferred well, while if the filling pressure is too high, the mold has to be made high in rigidity and is not economical. The mold clamping pressure is usually 0.01 to 10 MPa in range. As the heating method of the polymerizable composition, the method of using an electric heater embedded in the mold or steam or another heating means, the method of heating the mold in an electric oven, etc. may be mentioned.

The method of the above (c) is suitably used for obtaining a sheet shaped or film shaped cross-linkable resin shaped article. The obtained shaped article has a thickness of usually 0.001 to 10 mm, preferably 0.005 to 1 mm, more preferably 0.01 to 0.5 mm in range. If in this range, the shapeability at the time of lamination and the mechanical properties, toughness, etc. of the laminate are improved, so this is preferable. For example, the polymerizable composition can be impregnated in the fiber reinforcing material by coating a predetermined amount of the polymerizable composition by the spray coat method, dip coat method, roll coat method, curtain coat method, die coat method, slit coat method, or other known method, superposing a protective film over it as desired, and pressing by rollers etc. from the upper side. By impregnating the polymerizable composition in a fiber reinforcing material, then heating the impregnated material at a predetermined temperature, the polymerizable composition is bulk polymerized to obtain a desired cross-linkable resin shaped article. In the cross-linkable resin shaped article, the content of the fiber reinforcing material is usually 10 to 90 wt %, preferably 20 to 80 wt %, more preferably 30 to 70 wt % in range. If in this range, the dielectric properties and mechanical strength of the obtained laminate are balanced, so this is preferred.

As the fiber reinforcing material, an inorganic and/or organic based fiber can be used. For example, PET (polyethylene terephthalate) fiber, aramid fiber, ultrahigh molecular weight polyethylene fiber, polyamide (nylon) fiber, liquid crystal polyester fiber, and other organic fiber; glass fiber, carbon fiber, alumina fiber, tungsten fiber, molybdenum fiber, titanium fiber, steel fiber, boron fiber, silicon carbide fiber, silica fiber, and other inorganic fiber; etc. may be mentioned. Among these, organic fiber or glass fiber is preferred. In particular, aramid fiber, liquid crystal polyester fiber, and glass fiber are preferable. As glass fiber, fiber of E glass, NE glass, S glass, D glass, H glass, etc. may be suitably used. These may be used as single types alone or as two types or more combined. The fiber reinforcing material is not particularly limited in shape. For example, matte, cloth, nonwoven fabric, etc. may be mentioned.

As the heating method of the impregnated material obtained by impregnating a fiber reinforcing material with a polymerizable composition, for example, the method of placing the impregnated material on a support and heating like with the method of the above (a), the method of setting a fiber reinforcing material inside a mold in advance, impregnating it by a polymerizable composition in the mold to obtain an impregnated material, and heating like with the method of the above (b), etc. may be mentioned.

In each of the methods of the above (a), (b), and (c), the heating temperature for polymerizing the polymerizable composition is usually 30 to 250° C., preferably 50 to 200° C., more preferably 90 to 150° C. in range and is less than the one-minute half life temperature of the cross-linking agent, usually a radical generator, preferably 10° C. or more below the one-minute half-life temperature, more preferably 20° C. or more below the one-minute half-life temperature. Further, the polymerization time may be suitably selected, but usually is 1 second to 20 minutes, preferably 10 seconds to 5 minutes. By heating the polymerizable composition under such conditions, a cross-linkable resin shaped article with little unreacted monomer is obtained, so this is preferred.

The thus obtained cross-linkable resin shaped article of the present invention substantially does not have a cross-linked structure and, for example, can dissolve in toluene. The molecular weight of the polymer is, in terms of the weight average molecular weight converted to polystyrene which is measured by gel permeation chromatography (eluent: tetrahydrofuran), usually 1,000 to 1,000,000, preferably 5,000 to 500,000, more preferably 10,000 to 100,000 in range.

The cross-linkable resin shaped article of the present invention can be heated to cause a cross-linking reaction and obtain a cross-linked resin shaped article, but may also have part of the component resins cross-linked. For example, when bulk polymerizing the above-mentioned polymerizable composition in the mold, at the center part in the mold, sometimes dissipation of the heat of the polymerization reaction is difficult, so part of the inside of the mold becomes too high in temperature. At the high temperature part, sometimes a cross-linking reaction occurs and cross-linking results. However, if the surface part where heat is easily dissipated is formed by a cross-linkable resin, the cross-linkable resin shaped article of the present invention can sufficient exhibit the desired effects. The cross-linkable resin shaped article of the present invention is, for example, preferably used as a prepreg.

(Cross-Linked Resin Shaped Article)

The cross-linked resin shaped article of the present invention is obtained by cross-linking the above-mentioned cross-linkable resin shaped article of the present invention. The cross-linkable resin shaped article can be cross-linked by maintaining the shaped article at least at a temperature where a cross-linking reaction occurs in a heat curable resin which forms the shaped article. The heating temperature is usually at least the temperature at which a cross-linking reaction is induced by a cross-linking agent. For example, when using a radical generator as a cross-linking agent, the temperature is usually the one-minute half life temperature or more, preferably a temperature 5° C. or more higher than the one-minute half life temperature, more preferably a temperature 10° C. or more higher than the one-minute half life temperature. Typically, it is 100 to 300° C., preferably 150 to 250° C. in range. The heating time is 0.1 to 180 minutes, preferably 0.5 to 120 minutes, more preferably 1 to 60 minutes in range.

Further, when using a cycloolefin polymer as the heat curable resin which forms the cross-linkable resin shaped article of the present invention, by holding the above-mentioned polymerizable composition at the temperature at which the cross-linkable resin shaped article cross-links or more, specifically by heating at the above-mentioned temperature and time, it is possible to make the bulk polymerization of the cycloolefin monomer and the cross-linking reaction at the cycloolefin polymer occurring due to the polymerization proceed together so as to produce the cross-linked resin shaped article of the present invention. When producing the cross-linked resin shaped article of the present invention in this way, if using, in accordance with the method of the above (a), for example, a support member constituted by a copper foil, a copper clad laminate (CCL) can be obtained.

(Laminate)

The laminate of the present invention has at least a layer which is comprised of the above-mentioned cross-linkable resin shaped article of the present invention or the above-mentioned cross-linked resin shaped article of the present invention. Two shaped articles may be consecutively laminated or may be indirectly laminated through another layer.

As the laminate which is obtained by laminating the cross-linkable resin shaped article of the present invention, for example, an RCC, obtained by the method of the above (a), comprised of copper foil and a cross-linkable resin shaped article joined integrally in layers may be mentioned. Further, as the laminate which is comprised of the cross-linked resin shaped article of the present invention laminated, for example, a CCL, obtained by the method of the above (a), comprised of copper foil and a cross-linked resin shaped article joined integrally in layers may be mentioned. In the method of the above (a), if using as the support a separately obtained cross-linked resin shaped article, it is possible to obtain a laminate which is comprised of a plurality of cross-linkable resin shaped articles and/or cross-linked resin shaped articles which are laminated together.

Further, when the cross-linkable resin shaped article of the present invention is a sheet shape or a film shape, the cross-linkable resin shaped article may as desired have a sheet shaped or film shaped cross-linked resin shaped article laminated on it and furthermore, for example, may have the above metal foil laminated on it and be hot pressed for cross-linking so as to obtain a laminate of the present invention comprised of cross-linked resin shaped articles which are laminated on each other. At that time, the above RCC, CCL, or other laminate may also be laminated. The pressure at the time of hot pressing is usually 0.5 to 20 MPa, preferably 3 to 10 MPa. The hot pressing may be performed in a vacuum or in a reduced pressure atmosphere. The hot pressing may be performed by using a known press machine which has a press mold for forming a flat plate or press forming machine which is uses for sheet mold compounds (SMC) or bulk mold compounds (BMC).

The laminate of the present invention is obtained by using the above-mentioned cross-linkable resin shaped article of the present invention or the above-mentioned cross-linked resin shaped article of the present invention, so is excellent in heat resistance, is low in linear expansion, and is excellent in reliability. Therefore, the laminate of the present invention can be suitably used as a high frequency board material which has a broad range of applications. For example, the laminate of the present invention may be particularly preferably used as a multilayer printed circuit board comprised of the laminate on which a circuit layer or other conductor layer is formed.

EXAMPLES

Below, examples and comparative examples will be used to explain the present invention more specifically, but the present invention is not limited to these examples. Note that, the "parts" and "%" in the examples and comparative examples are based on weight unless otherwise indicated.

The properties in the examples and comparative examples were measured and evaluated in accordance with the following methods.

(1) Dynamic Viscoelasticity

The cross-linked resin shaped article was cut to a size of a thickness of 1.5 mm, width of 5 mm, and length of 45 mm for use as a measurement use sample. The obtained measurement use sample was measured by a dynamic viscoelasticity tester (Model: EXSTAR DMS6100, made by Seiko Instruments) to find the elasticity E' at a frequency of 1 Hz and 260° C. This was defined as the dynamic viscoelasticity. Note that, the higher the dynamic viscoelasticity, the smaller the deformation at a high temperature and the better the heat resistance which can be evaluated.

(2) Linear Expansion Coefficient

The cross-linked resin shaped article was cut to a size of a thickness of 1.5 mm, width of 5 mm, and length of 45 mm for use as a measurement use sample. A linear expansion coefficient measuring device (Model: EXSTAR TMA6200, made by Seiko Instruments) was used to measure it at a temperature elevation rate of 5° C./minutes at 30 to 300° C. in range so as to find the linear expansion coefficient at 40 to 100° C. in range and the linear expansion coefficient at 200 to 220° C. in range. The former temperature range corresponds to the temperature range of practical use of the cross-linked resin shaped article, while the latter temperature range corresponds to the temperature range at the time of molding a cross-linked resin shaped article. It is preferable that the linear expansion coefficient be low at both temperature ranges.

(3) Glass Transition Temperature (Tg)

In the measurement by the dynamic viscoelasticity tester in the above (1), the glass transition temperature (Tg) was found from the peak value of tan δ.

Example 1

In a glass flask, benzylidene(1,3-dimesityl-4-imidazolidine-2-ylidene)(tricyclohexylphosphine)ruthenium dichloride 51 parts and triphenylphosphine 79 parts were dissolved in toluene 952 parts to prepare a catalyst solution.

Further, separate from the above, to a polyethylene bottle, a cycloolefin monomer comprised of dicyclopentadiene (including 10% cyclopentadiene trimer) 100 parts, a chain transfer agent comprised of allyl methacrylate 3 parts, a cross-linking agent comprised of di-t-butyl peroxide [one-minute half life temperature 186° C.; Kayabutyl D (Registered Trademark), made by Kayaku Akzo] 1 part, and a condensed aromatic polycyclic compound which has a (meth)acryloyloxy group comprised of 1,4-dimethacryloyloxynaphthalene (Mc-N, made by Kawasaki Kasei Chemicals, Ltd.) 5 parts were added and mixed and dissolved to obtain a monomer solution. Next, the above prepared catalyst solution was added to and stirred with the above prepared monomer solution in a ratio of 0.12 mL per 100 g of cycloolefin monomer to thereby prepare a polymerizable composition. Note that, the structure of a condensed aromatic polycyclic compound which has a (meth)acryloyloxy group comprised of 1,4-dimethacryloyloxynaphthalene is shown below.

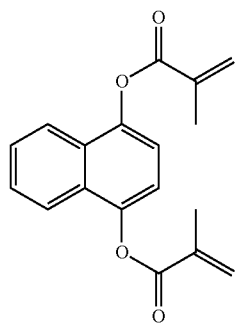 [SMILES: C=C(C)C(=O)Oc1ccc(OC(=O)C(=C)C)c2ccccc12]

Next, 100 parts of the obtained polymerizable composition were cast into a mold with a block shaped space of a size of a vertical 10 cm, horizontal 10 cm, and depth 1.5 mm. The cover was closed to seal the space, then the mold was placed in a 100° C. oven for 5 minutes to cause polymerization and obtain a cross-linkable resin shaped article. Further, the obtained cross-linkable resin shaped article was placed in a 200° C. oven for 15 minutes to cure it and obtain a cross-linked resin shaped article. Further, the obtained cross-linked resin shaped article was used for measurement of the dynamic viscoelasticity, linear expansion coefficient, and glass transition temperature (Tg) by the above methods. The results are shown in Table 1.

Example 2

Except for changing the amount of the condensed aromatic polycyclic compound which has a (meth)acryloyloxy group comprised of 1,4-dimethacryloyloxynaphthalene from 5 parts to 10 parts, the same procedure was followed as in Example 1 to obtain a polymerizable composition, cross-linkable resin shaped article, and cross-linked resin shaped article and similarly evaluate the same. The results are shown in Table 1.

Example 3

Except for changing the amount of the condensed aromatic polycyclic compound which has a (meth)acryloyloxy group comprised of 1,4-dimethacryloyloxynaphthalene from 5 parts to 20 parts, the same procedure was followed as in Example 1 to obtain a polymerizable composition, cross-linkable resin shaped article, and cross-linked resin shaped article and similarly evaluate the same. The results are shown in Table 1.

Comparative Example 1

Except for not using the condensed aromatic polycyclic compound which has a (meth)acryloyloxy group comprised of 1,4-dimethacryloyloxynaphthalene, the same procedure was followed as in Example 1 to obtain a polymerizable composition, cross-linkable resin shaped article, and cross-linked resin shaped article and similarly evaluate the same. The results are shown in Table 1.

Comparative Example 2

Except for using, instead of the condensed aromatic polycyclic compound which has a (meth)acryloyloxy group comprised of 1,4-dimethacryloyloxynaphthalene 5 parts, 1,6-dimethacryloyloxyhexane (HD-N, made by Shin-Nakamura Chemical Co., Ltd.) 20 parts, the same procedure was followed as in Example 1 to obtain a polymerizable composition, cross-linkable resin shaped article, and cross-linked resin shaped article and similarly evaluate the same. The results are shown in Table 1.

TABLE 1

|  |  | Example | | | Comp. Ex. | |
| --- | --- | --- | --- | --- | --- | --- |
|  |  | 1 | 2 | 3 | 1 | 2 |
| Dicyclopentadiene (*) | (parts) | 100 | 100 | 100 | 100 | 100 |
| Allyl methacrylate | (parts) | 3 | 3 | 3 | 3 | 3 |
| Di-t-butyl peroxide | (parts) | 1 | 1 | 1 | 1 | 1 |
| 1,4-dimethacryloyloxynaphthalene | (parts) | 5 | 10 | 20 | — | — |
| 1,6-dimethacryloyloxyhexane | (parts) | — | — | — | — | 20 |
| Dynamic viscoelasticity(@260° C.) | (MPa) | 110 | 100 | 300 | 19 | 15 |
| Linear expansion coefficient (40 to 100° C.) | (ppm/° C.) | 70 | 74 | 68 | 76 | 93 |
| Linear expansion coefficient (200 to 220° C.) | (ppm/° C.) | 184 | 165 | 126 | 220 | 180 |
| Glass transition temperature (Tg) | (° C.) | 206 | 213 | 218 | 165 | 179 |

(*) Containing trimer of dicyclopentadiene in 10%.

From Table 1, it will be understood that the cross-linked resin shaped articles which were obtained in Examples 1 to 3 all were high in dynamic viscoelasticity, small in heat deformation at the time of a high temperature, and excellent in heat resistance and, further, had a low linear expansion coefficient in both the temperature ranges of 40 to 100° C. and 200 to 220° C. and had a high glass transition temperature (Tg) (that is, were excellent heat resistance).

On the other hand, in Comparative Example 1 which did not use a condensed aromatic polycyclic compound which has a (meth)acryloyloxy group, the dynamic viscoelasticity was low, the linear expansion coefficient in a temperature range of 200 to 220° C. was high, and the glass transition temperature (Tg) was low.

Further, in Comparative Example 2 which used 1,6-dimethacryloyloxyhexane as a compound which has a (meth)acryloyloxy group, but does not have a condensed aromatic polycyclic structure, the dynamic viscoelasticity was low, the linear expansion coefficient in a temperature range of 40 to 100° C. was high, and the glass transition temperature (Tg) was low.

The invention claimed is:

1. A cross-linkable resin shaped article which contains a heat curable resin, cross-linking agent, and condensed aromatic polycyclic compound which has a (meth)acryloyloxy group, wherein said heat curable resin is a cycloolefin polymer.

2. The cross-linkable resin shaped article as set forth in claim 1, wherein said condensed aromatic polycyclic compound which has a (meth)acryloyloxy group is a compound which is shown in the following general formula (1):

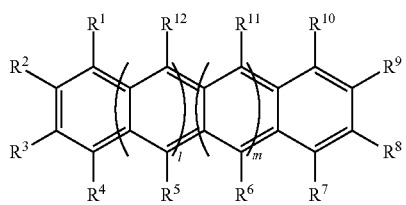

wherein, in formula (1), "l" and "m" are respectively integers of 0 to 10, at least one of $R^1$ to $R^{12}$ is a substituent which is shown by the formula (2): $-L_p(-M)_n$, wherein, in formula (2), L is a divalent to tetravalent $C_1$ to $C_{20}$ organic group which may contain a hetero atom, M is a (meth)acryloyloxy group, and "n" is an integer of 1 to 3, "p" is 0 or 1, a substituent other than the substituent expressed by said formula (2) is at least one selected from the group which is consisted of a hydrogen atom, halogen atom, $C_1$ to $C_{20}$ linear or branched alkyl group, $C_1$ to $C_{20}$ linear or branched alkenyl group, aryl group, and hetero atom-containing group.

3. The cross-linkable resin shaped article as set forth in claim 2, wherein said condensed aromatic polycyclic compound which has a (meth)acryloyloxy group is one which has two substituents which are expressed by said formula (2).

4. The cross-linkable resin shaped article as set forth in claim 3, wherein said condensed aromatic polycyclic compound which has a (meth)acryloyloxy group is 1,4-dimethacryloyloxynaphthalene.

5. The cross-linkable resin shaped article as set forth in claim 1, wherein the amount of said condensed aromatic polycyclic compound which has a (meth)acryloyloxy group is 0.1 to 100 parts by weight with respect to 100 parts by weight of said cycloolefin polymer.

6. The cross-linkable resin shaped article as set forth in claim 1, which is obtained by bulk polymerizing a polymerizable composition containing said cycloolefin monomer, metathesis polymerization catalyst, said cross-linking agent, and said condensed aromatic polycyclic compound which has a (meth)acryloyloxy group.

7. A cross-linked resin shaped article which is obtained by cross-linking a cross-linkable resin shaped article as set forth in claim 1.

8. A laminate which has at least a layer which is comprised of a cross-linkable resin shaped article as set forth in claim 1.

9. A laminate which has at least a layer which is comprised of a cross-linked resin shaped article as set forth in claim 7.

* * * * *